United States Patent
Swinney

(10) Patent No.: US 6,658,384 B2
(45) Date of Patent: *Dec. 2, 2003

(54) DATA COLLECTION AND AUTOMATIC REMOTE TRANSMISSION SYSTEM

(76) Inventor: Robert S. Swinney, 1760 N. Pepper St., Altadena, CA (US) 91001

( * ) Notice: Subject to any disclaimer, the term of this patent is extended or adjusted under 35 U.S.C. 154(b) by 0 days.

This patent is subject to a terminal disclaimer.

(21) Appl. No.: 09/892,801

(22) Filed: Jun. 26, 2001

(65) Prior Publication Data

US 2002/0077810 A1 Jun. 20, 2002

Related U.S. Application Data

(63) Continuation of application No. 09/340,868, filed on Jun. 28, 1999, now Pat. No. 6,259,657.

(51) Int. Cl.[7] .............................................. G10L 15/26
(52) U.S. Cl. ........................ 704/235; 704/246; 369/25
(58) Field of Search ................................ 704/235, 246, 704/251, 272, 270; 369/25, 26, 27, 28, 29

(56) References Cited

U.S. PATENT DOCUMENTS

| | | | |
|---|---|---|---|
| 4,041,249 A | 8/1977 | Matz et al. ................ 704/735 |
| 4,301,525 A * | 11/1981 | Mohammadioun et al. . 704/235 |
| 4,658,097 A | 4/1987 | D'Agosto, III et al. ...... 704/735 |
| 5,146,439 A * | 9/1992 | Jachmann et al. ............ 369/25 |
| 5,398,220 A * | 3/1995 | Barker ......................... 369/25 |
| 5,477,511 A | 12/1995 | Englehardt .................. 704/735 |
| 5,491,774 A * | 2/1996 | Norris et al. ................ 704/270 |
| 5,548,566 A | 8/1996 | Barker ........................ 704/735 |
| 5,818,800 A | 10/1998 | Barker ........................ 704/735 |
| 5,898,916 A | 4/1999 | Breslawsky |
| 6,038,199 A * | 3/2000 | Pawlowski et al. ........... 369/25 |
| 6,259,657 B1 * | 7/2001 | Swinney ..................... 704/270 |
| 6,282,154 B1 * | 8/2001 | Webb .......................... 369/25 |

* cited by examiner

*Primary Examiner*—Daniel Abebe
(74) *Attorney, Agent, or Firm*—Knobbe, Martens, Olson & Bear LLP

(57) ABSTRACT

A personal medical dictation system that can be easily and conveniently used to capture and preserve audio information. The system includes a specially designed portable, hand-held recording component that is of a small size, but yet is capable of storing at least one hour of actual dictation in compressed form and a cooperating dictation receiver that functions to automatically transfer the recorded data to a central processing area. The hand-held recording component can be expeditiously, mechanically, and electrically transmitted to the central processing area for transcription. The dictation receiver component also automatically recharges the batteries of the hand-held recording unit.

24 Claims, 6 Drawing Sheets

DATA COLLECTION AND AUTOMATIC REMOTE TRANSMISSION SYSTEM

RELATED APPLICATION

This application is a continuation of application Ser. No. 09/340,868, filed on Jun. 28, 1999, now U.S. Pat. No. 6,259,657, the entire contents of which are hereby expressly incorporated by reference.

BACKGROUND OF THE INVENTION

1. Field of the Invention

The present invention relates generally to a method and apparatus for collecting and preserving data. More particularly the invention concerns a method and apparatus for collecting and preserving medical information obtained by a physician using a personal medical dictator device and then preserving the data through the use of a novel dictation receiver apparatus.

2. Discussion of the Prior Art

Several devices have been suggested in the past for recording and preserving audio data. The most common of these devices is the conventional dictation recording device that records a user's dictation on a magnetic tape. The so-called prior art tape recorder reproduces the dictation by reading the recorded signal from the magnetic tape and preparing an electric signal representative of the recorded dictation. After the dictation is recorded, the user typically provides the magnetic tape to a typist who prepares a type written transcript. This is done by inserting the magnetic tape into a tape playing device which includes means for generating an acoustic reproduction of the dictation recorded on the magnetic tape. While listening to the reproduction of the dictation, the typist types a transcript of the dictation on the keyboard of a typewriter or word processing device.

In the past many physicians have made rather wide use of both hand-held and desk-mounted dictation devices to record their activities. The physician's description of interactions with patients whether in the office, in the hospital or in the operating room, are vital to the delivery of quality health care. Furthermore, documentation by the doctor is mandatory for legal purposes, to meet demands of regulatory bodies, and for effective business practices, including efficient billing, contractual compliance and the like. The permanent records of the physician's activities that are produced are typically kept in the medical record or "chart" of the patient.

When tape recorders are not used by the physician to record day-to-day activities, records are sometimes handwritten. On occasion the physician will also use a telephone to dictate notes to a remote receiving unit, usually located at a transcription location. At the transcription location a medical secretary or other typist transcribes the doctors spoken notes into text using a typewriter or word processor. The typed dictation is then placed in the medical record.

In other instances, the physician may use a hand-held digital recorder and electronically transfer the dictation directly to a personal computer. Several different types of digital recorders and the computer software to operably connect them to a personal computer are readily commercially available.

Each of the foregoing prior art techniques has its drawbacks. For example, when either a hand-held or desk-mounted tape recorder is used, the magnetic tape onto which the dictation is stored must be physically acquired and inserted into the recorder and then removed when the dictation is complete. The tape must then be physically delivered to the transcription location. During this process the tape can be lost, damaged, or recorded over prior to transcription resulting in the loss of crucial data. When using the tape recorder, access to prior dictation on the magnetic tape, or access to an earlier portion of the current dictation is slow and inconvenient because the tape must be physically rewound to the desired location.

With respect to telephone dictation, the physician must, of course, be in proximity to a telephone and the telephone must be available for use. If the telephone is not immediately accessible by the physician, time is lost in walking to the telephone and if the telephone is in use by another person, additional valuable time can be lost waiting for access to the telephone. In using the telephone to dictate medical records, the physician must dial the transcription location telephone number which may involve as much as a 12 digit number. Additionally, the physician must remember, or look up which numerical keys on the telephone are to be used to perform typical dictation functions. Once the transcription location is dialed, the physician must wait for the remote receiving unit to answer before dictation can commence. After the dictation unit answers, the physician must wait for instructions from the answering unit and then perform manual operations as directed as, for example, keying in the report type and the patient's record number. Finally, on each occasion, the physician must key in information that is constant as, for example, the physician's identification number and other data which does not change for a series of particular patients. All of these actions involve wasted motion and wasted time.

Problems concerning the use of prior art, hand-held digital recorders include the fact that most commercially available digital dictation devices are designed for general-purpose use and, therefore, have unnecessary keys and functions that complicate their use for medical dictation. Additionally, presently available digital recording devices require that a physical connection be made for re-charging and for data transmission from the recording device to a receiving device, such as a personal computer that is necessarily located in the immediate vicinity of the digital recorder. Finally, existing digital recording devices require that a computer program be run on the receiving computer in order for the dictation to be transferred from the device into the memory of the computer so that the transcription activity can be performed.

One example of the aforementioned type of prior art voice recording system is disclosed in U.S. Pat. No. 5,389,220 issued to Barker. The Barker system includes a portable voice recording device having a microphone for generating an electrical signal representative of an acoustic speech signal. An analog to digital converter receives the electric signal from the microphone and generates a digital memory signal representative of the electric signal. A memory device stores the digital memory signal. In response to a user's request, a digital to analog converter converts the memory signal to an analog electrical signal which drives a loudspeaker to generate an acoustic reproduction of the original speech signal. Somewhat similar Barker dictation recording devices are disclosed in U.S. Pat. Nos. 5,548,566 and 5,818,800 also issued to Barker. While the Barker systems represent significant advance in the art, to effect the transfer of the dictation from the recording device of the receiving machine, the user must still be somehow "tethered" to a personal computer. Also, manual processes, such as installation and operation of receiving software, are required As will be better understood from the discussion which follows, a primary object of the present invention is to overcome the drawbacks of the prior art data recording and preservation systems as described in the preceding paragraphs by providing a simple, easy to use and highly efficient personal medical dictation system that facilitates the recording of the physician's dictation and the subsequent automatic transmittal of that dictation without effort on the part of the physician to a non-contiguous central location from which transcription quickly and efficiently can take place.

SUMMARY OF THE INVENTION

By way of summary the personal dictation system of the present invention comprises two cooperating devices that facilitate the recording of a physician's dictation and the subsequent transmittal of the dictation to a remotely located central location at which transcription of the recorded data can take place. The "capturing" component of the system, or "Personal Medical Dictator" (PMD) comprises a specially designed, compact, and hand-held, portable, battery-powered unit that can be carried in a pocket or worn on the belt. The "transmission" component or Dictation Receiver (DR) comprises a countertop or wall mounted receptacle or docking station into which the capturing component (PMD) is placed so that dictation can be quickly and automatically transferred from the capturing device and into the dictation receiver. From the Dictation Receiver (DR) the data is then automatically transferred to a remote central processing area and, at the same time, the batteries of the capturing component are automatically re-charged.

With the foregoing in mind, it is an object of the present invention to provide a personal medical dictation system that will be accepted by physicians and one that can be easily and conveniently used by physicians to capture and preserve descriptions of their interactions with patients. More particularly, it is an object of the invention to provide a system that includes a specially designed portable, hand-held recording component that is of a small size, but yet is capable of storing at least one hour of actual dictation in compressed form and a cooperating dictation receiver for automatically transferring the recorded data to a central processing area.

It is another object of the invention to provide a system of the character described in the preceding paragraphs in which the hand-held recording component comprises a simplified, easy-to-use, digital recorder that can be expeditiously mated with the dictation receiver so that the recorded data can be rapidly and accurately transmitted to the central processing area without effort by the physician for transcription.

Another object of the invention is to provide a novel personal medical dictation system of the class described in which the dictation receiver that is cooperatively associated with the hand-held digital recorder, not only quickly and accurately transmits the recorded data to a central processing area for transcription, but, at the same time, also automatically re-charges the batteries of the hand-held recording unit.

Another object of the invention is to provide a system of the aforementioned character that is highly reliable in operation and is specially designed to insure that the physician's valuable recorded audio dictation is not lost during processing.

Another object of the invention is to provide a system as described in the preceding paragraph in which the captured dictation is accurately transcribed and returned to the physician in minimum time.

Another object of the invention is to provide a capturing component that exhibits superior speech quality that is no worse than high quality telephone transmission.

Another object of the invention is to provide a capturing component that includes a speaker system for audio playback of dictation and for audio transmission of instructional and informational messages stored in the memory of the device.

Another object of the invention is to provide a capturing component or handheld recorder of the character described in the preceding paragraphs, which further includes a visual display located on the front cover of the device to provide visual indicators, such as messages regarding dictation length and position, battery power remaining, options and so forth.

The foregoing and other objectives will be met by the novel personal medical dictation system illustrated in the drawings and described hereinafter.

DESCRIPTION OF THE INVENTION

Figure 1:
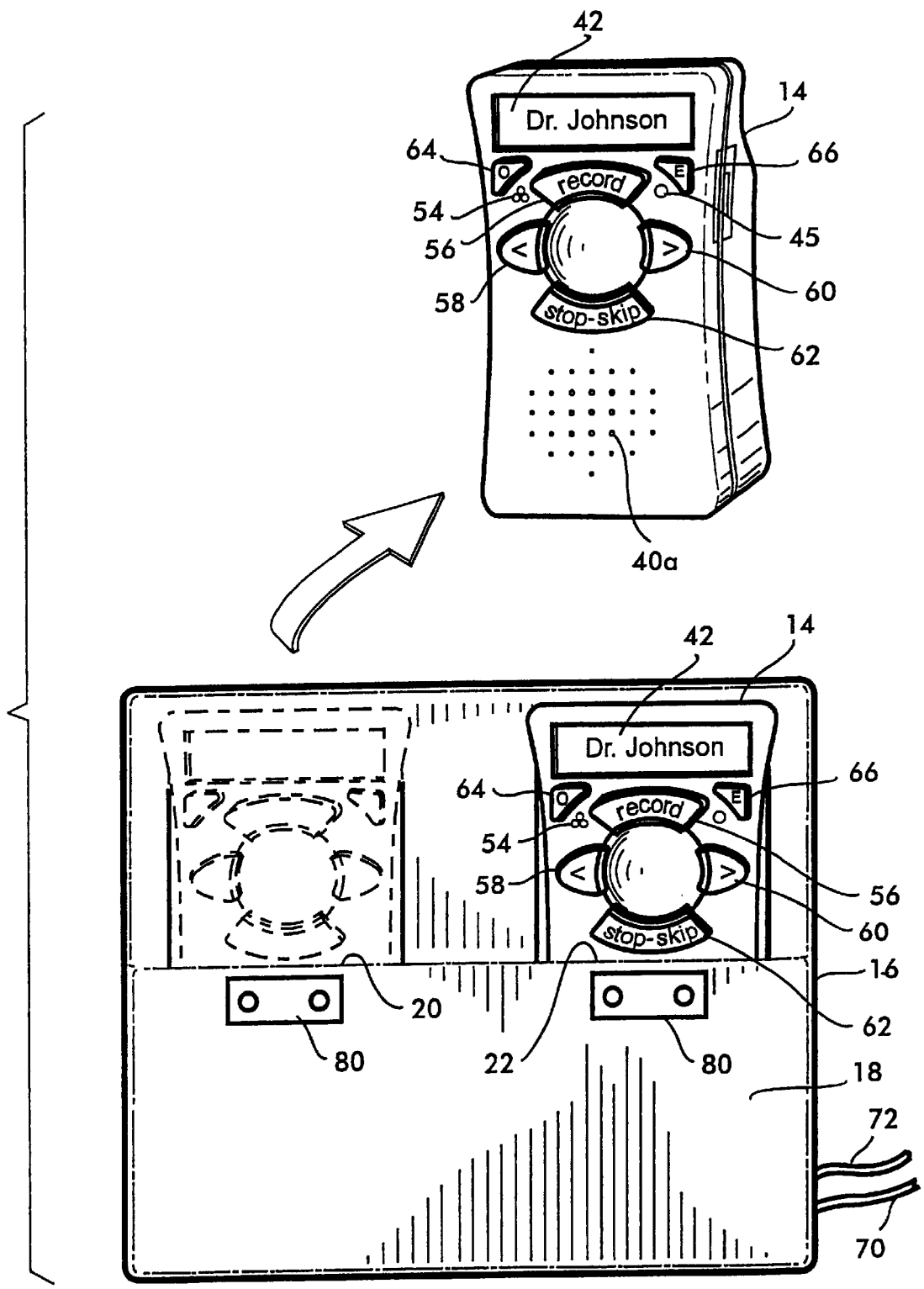
FIG. 1 is a generally perspective exploded view of one form of the personal medical dictation system of the present invention.
Figure 2:
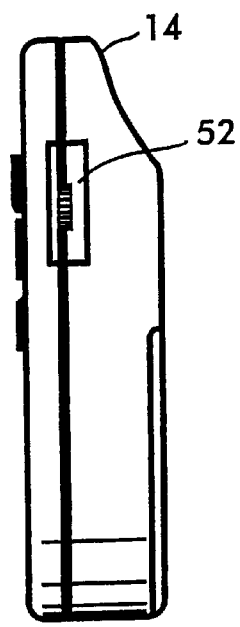
FIG. 2 is a right side elevational view of the capturing device or hand-held digital recorder component of the system shown in FIG. 1.
Figure 3:
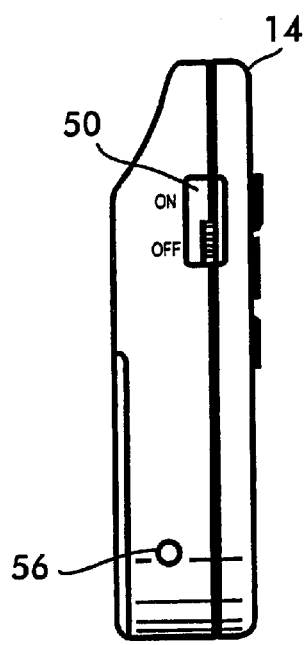
FIG. 3 is a left side elevational view of the hand-held recorder shown in FIG. 1.
Figure 4:
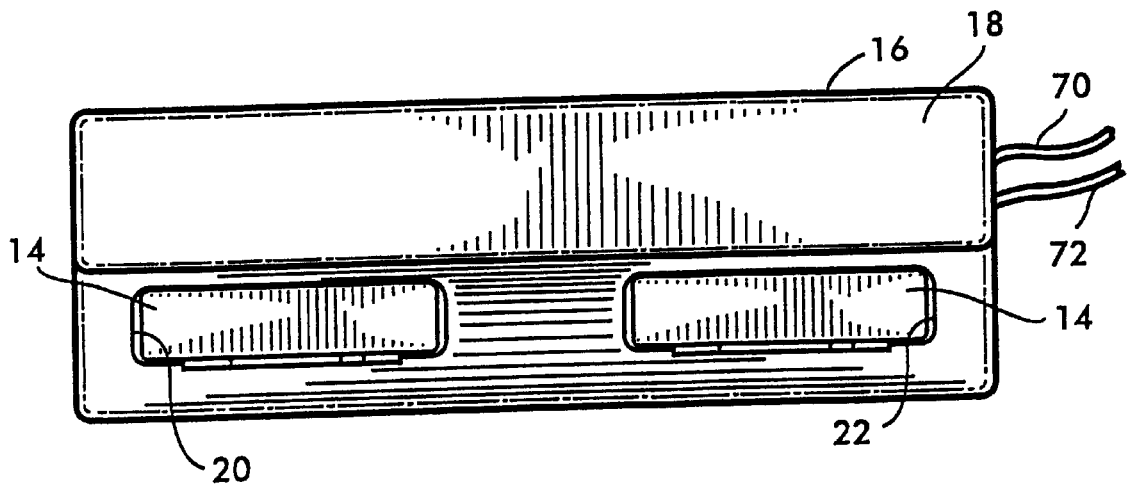
FIG. 4 is a top plan view of the system shown in FIG. 1.
Figure 5:
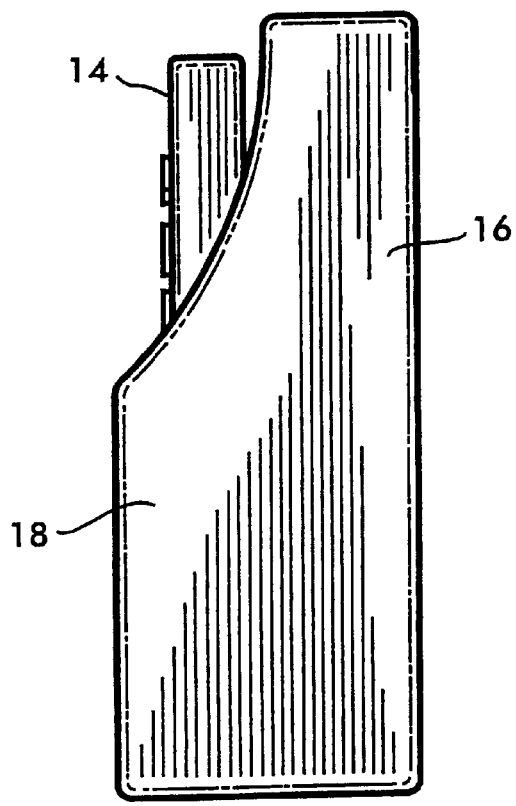
FIG. 5 is a right side elevational view of the system shown in FIG. 1.
Figure 6:
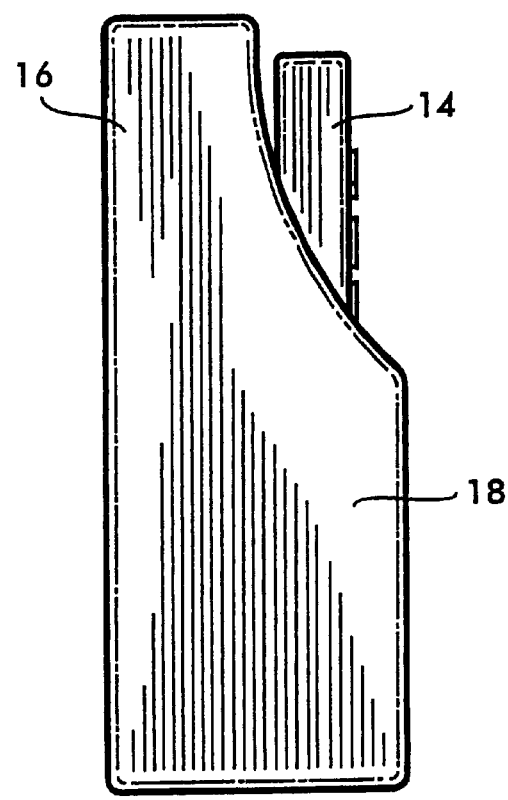
FIG. 6 is a left side elevational view of the system shown in FIG. 1.

Referring to the drawings and particularly to FIGS. 1 through 6, one form of the apparatus of the invention for collecting and preserving medical information obtained by a physician is there shown. The apparatus here comprises a data capturing device or personal medical dictator (PMD) identified by the numeral 14 and a cooperatively associated dictation receiver (DR) generally identified by the numeral 16. In the present form of the invention, the PMD comprises a portable voice recording device which is of a novel construction later to be described. As shown in FIGS. 1, 5, and 6, the dictation receiver 16 is provided in the form of a docking station 18 having first and second PMD receiving compartments or receptacles 20 and 22 respectively (FIGS. 1 and 4).

Figure 8:
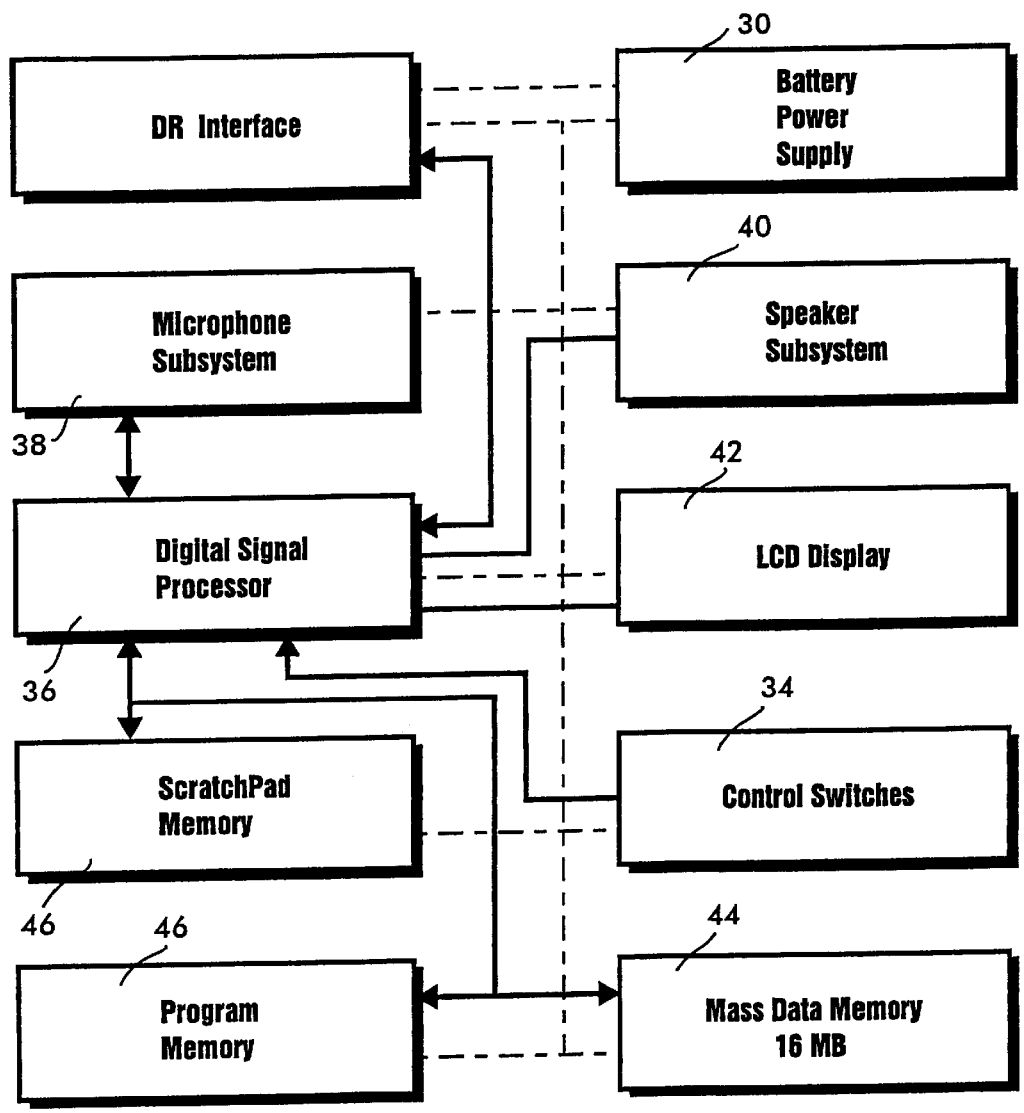
FIG. 8 is a generally diagrammatic view showing in block diagram form one embodiment of the capturing component or personal medical dictator of the system of the invention

Referring to FIG. 8, which is a block diagram showing the interrelationship of the various PMD components, the PMD can be seen to include a power supply 30, which is of conventional construction, and a linear regulator for output control as well as for battery charging. As indicated in FIG. 8, the conditional power produced by power supply 30 is used by all the components of the PMD. In this regard, power supply 30 is designed to support more than 24 hours dictation before recharging and a full recharge of the unit can be accomplished in less that one hour at the high rate or charge and in less than eight hours at the normal rate of charge.

The primary data input means to the PMD comprises a microphone subsystem 32 for picking up the physician's dictation, and a series of control switches 34 for dictation control, replay and editing. The microphone of the subsystem receives the audio information from the physician and generates an electrical signal representative of this audio input information. In the present form of the invention, the microphone subsystem 32 will support a full 5 kHz bandwidth, yet present no aliased information when sampled at 20 kHz by the digital signal processor unit 36. In this regard, a four-pole filter comprises a part of the microphone subsystem 38. An important feature of each of the PMD components comprises means for placing the system in a sleep mode if no voice input occurs after a set time period. Preferably this means is implemented in the previously mentioned digital signal processor unit 36. Which is of a character well understood by those skilled in the art.

As indicated in FIG. 8, the PMD component further includes a speaker subsystem 40 that is of conventional construction and comprises a suitable audio amplifier and speaker. The primary purpose of the speaker system is to review and edit material already recorded and to provide audio cues to the user. Typical audio cues include: the name of the physician to whom the unit is assigned; the identification number of the patients involved; a request for the location at which the data file is to be returned; and queries, such as, by way of example, request to both speak and spell the name of a patient. Speaker system 40 is of a character well known in the art and can be readily designed and constructed by those skilled in the art.

The LCD display 42 is coupled with the digital signal processor which is also of conventional construction and functions to provide status information to the user as, for example, remaining battery life memory, pointer location, current user identification, current file identification and the like.

In operation, the digital signal processor 36, which comprises a digital to analog converter, digitizes the electrical signal output of the microphone subsystem 38 to produce a digital memory signal representative of the electrical signal. The signal processor then compresses the data to make efficient use of the mass data storage memory 44 with which it is operably coupled. Processor 36 also monitors the status of the control switches 34 (FIG. 8) to determine the current function to be implemented. The programs are stored in the program memory 44 which may be a flash memory or a mask programmed ROM of a character that is readily commercially available. A scratchpad memory 46 is coupled with the processor 36 and accomplishes compression algorithm calculations and also processes various other transient information.

Mass data memory 44 is operably coupled with program memory 46 and provides 16 MB of non-volatile storage. Memory 44 can be implemented with readily commercially available flash memory. Alternatively, if desired, the mass data memory 44 can comprise a battery backed CMOS static RAM which would provide faster memory access, and would also allow the scratchpad to share the same memory.

Preferably, each PMD has about eight MB file storage and has the capacity to store at least one hour's actual dictation. In compressed form, each minute of audio recording requires about 90 K bytes data storage. Therefore, the files will be about 5.4 MB in length.

Figure 7:
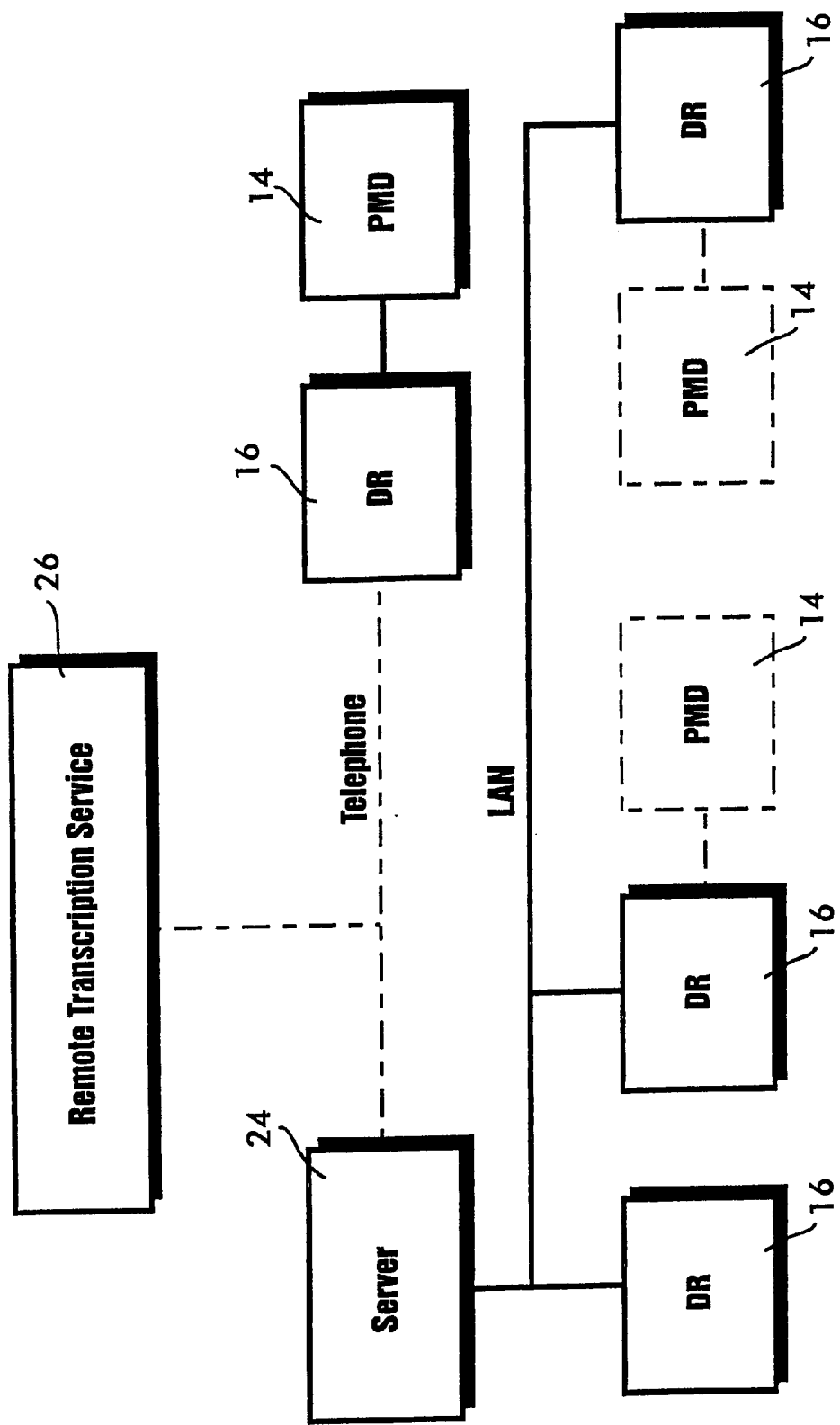
FIG. 7 is a generally diagrammatic view showing in block diagram form the various cooperating components that make up one embodiment of the personal medical dictation system of the invention.

Turning next to FIG. 7, which is a block diagram of one form of the system of the present invention, it can be seen that various dictation receiver (DR) units 16 of the system and a server identified by the numeral 24 are connected as a Local Area Network. The hardware implementation of the network may be as a standard Local Area Network (LAN) or in some instances as a telephone linked system wherein the DR units dials into a modem of the server for uploading or downloading of data. In this latter case, sever 24 may be a local computer system, or it may be located at the transcription service the character of which will presently be described. Each DR unit 16 must be connected a suitable power supply such as a 120 volt power supply (see FIG. 9).

A program running on the server 24 will collect data from the DR units, create temporary backup copies on a hard disk of the computer component, and then transmit the data to an external remote transcription service identified in FIG. 7 by the numeral 26. Transcription service 26 is located at a remote central processing area (CPA) and performs the data transcription and then returns a properly formatted text version of the data to the hospital or physician.

When a particular PMD 14 is placed into a selected one of the PMD receiving compartments or receptacles, 20 and 22 of the dictation receiver (FIG. 4), the stored data will be automatically transferred from the PMD to the compute component. Also, as previously mentioned, while the PMD is in the dictation receiver compartments of the docking station 16, the batteries of the PMD will be automatically recharged by a built-in battery charger disposed within the DR housing.

The data storage in the DR units 16 is non-volatile, either by battery backup on the memory board or by use of flash memory as the data storage medium. This provides tolerance against power dropout during the time between transfer of data from a PMD component 14 to the DR unit 16 and the transfer of the data from the DR to the server 24.

It is, of course, necessary that both the mechanical and the electrical design of the PMD units 14 be closely coordinated with the design of the DR units 16. As indicated in FIGS. 1 and 4, the components mechanically mate to a tolerance small enough to guarantee proper operation of the interface between them. The mating electrical interface between the components is such as to allow the PMD 14 to receive raw AC power from the DR 16 via a split toroidal transformer disposed within the housing of each DR unit, and pass it to the power supply block for rectification and battery charging. The PMD 14 also receives data from the DR 16 for housekeeping, such as clock control, user identification, and instructions to the user or program updates. The program updates and modification of user instructions will generally be downloaded to the DR 16 by the server 24, but may also be originated by the remote transcription service 26. In turn, the PMD passes user identification and compressed data to the DR. When the DR indicates the last data block has been successfully received, the memory pointers are reset, and the unit is ready for the next dictation session. If the DR unit signals a battery low condition in the PMD, the PMD must be left in the DR 16 until it is suitably recharged.

The PMD unit 14, as illustrated in the drawings and as described in the preceding paragraphs, can be manufactured without difficulty by those skilled in the art using readily commercially available components. Advantageously, as previously mentioned, the PMD unit 14 is specially designed for use in carrying out the particular methods of the invention so that its use will be readily accepted by practicing physicians. For example, the unit is ergonomically designed for ease of use without having to look at the unit to issue normal commands. The PMD component also supports convenient review and editing so that selected portions of the audio records can be selected and deleted or new segments inserted without danger of destroying previous portions of the recorded data.

As best seen by also referring to FIGS. 1 through 4, the sixteen character alphanumeric low power consumption LCD display 42 is placed on the top front of the device to prominently display to the physician the previously mentioned visual indicators. In this regard, messages concerning dictation length and position, battery power remaining, option choice, and so forth, are displayed under suitable software control in a manner well understood by those skilled in the art.

In operation of the PMD, a light emitting diode (LED) 45, which is provided on the front of each PMD unit, illuminates to indicate recording and erasure functions (FIG. 1). A conventional on-off switch 50, located on the right side of the PMD housing (FIG. 3) controls operation of the device and renders the function keys inoperative when the device is not in use so that the inadvertent depression of the keys (as when the device is carried in a pocket) produces no action. The off position also conserves battery power.

As indicated in FIG. 1, the speaker component 40a of the speaker subsystem 40 is located proximate the lower front of the device housing and allows for audio reproduction (playback) of dictations, and audio instructional messages stored in memory of the PMD. The system of the invention permits instructional messages to be added, deleted, and amended to readily accommodate the end use of the apparatus. In addition, audio indicators of various occurrences, for example, beginning of dictation reached on rewind, various error conditions, and the like are broadcast through the speaker.

By way of example, in the preferred form of the invention, the system has the capability to provide audio (voice) prompts to the user. In this regard, in many circumstances, it is important for the user to state specific information. For example, at the beginning of a medical dictation, the user needs to identify which patient he/she is going to talk about. The Personal Medical Director (PMD) will be able to prompt the user to dictate this data at the beginning of a new dictation. Specifically, when the user holds the "stop-skip" key (for >1 second) to "skip" to recording for a new patient, the PMD will play back a message that has been previously recorded, digitized, and stored in the memory of the PMD, such as "Spell patient name and say medical record number". Further, the PMD could "say" "welcome Dr. Johnson" at the beginning of the first dictation after prior dictations have been transmitted. Another example is the audio reminder "dictating at University Hospital" for those doctors who dictate on patients at more than one venue. This functionality enhances accuracy of identification of the patient for whom the dictation is being done as well as alerts the doctor to the situation where he/she is dictating but the PMD has been set to record dictation for another doctor.

Additionally, the system has the capability to selectively utilize audio prompts. For example, a doctor who consistently, regularly, routinely, or always spells his patient's names and always states the medical record number does not need to be reminded to do so. Consequently, the software program within the PMD will have logic included to "judge" whether or not a reminder prompt needs to be "spoken" at its usual point. This functionality enhances user acceptance and reduces the time needed for most users to begin their dictation.

Importantly, the system also has the capability to be "reprogrammed" via the central office computer as needed. Although the primary function of the PMD is to accept dictation and transmit it to a central office computer without further action on the part of the user, there is also a need to transmit data into the PMD; that is, there is a need for modification from time to time of some of the data within the PMD. For example, the PMD will contain various tables of information, one of which could be a list of physicians who are authorized to use the device. As physicians leave, their names need to be deleted and as new ones begin to work and use the PMD, their names need to be added. This important maintenance function is carried out at the central office computer, and needs to be transmitted into the applicable PMD.

In the same vein, the software that runs the PMD can be reprogrammed and the clock within the PMD can be synchronized with the clock of the central computer. Where required an ever changing password can be sent to the PMD from the central computer to enhance security.

Another important feature of one form of the invention is its capability to automatically send identification information to the central office computer. For example, one of the benefits of the PMD is that transmission of identifying information (e.g. the doctor's name and identification number) can occur automatically without the user having to speak his/her name and without the user having to enter or say his/her identification number. This happens because the list of authorized users is maintained within each PMD, and the current user data is transmitted with each dictation that is transmitted. The PMD can be programmed to maintain only one user in the list of those for whom this function will be operative or can be programmed to allow many users.

Still another important feature of the system of the invention resides in the fact that the PMD can be "programmed" to function specifically for particular user characteristics. Unlike prior art digital dictation recorders, the PMD is designed so that it contains data specific to the user. That is, a set of characteristics particular to a given user (or group of users) is maintained. For example, the device can store in its memory the physician's name and identification number and the venue where the patient was seen. Similarly, if a PMD is used by more than one doctor, each can choose his/her name from the "Doctor Option List". Importantly, the same technique can be used to specify whether a dictation is routine or is to be transcribed immediately.

A conventional wheel type volume control 52 is located on the right side of the device (FIG. 2), and a conventional microphone 54 which is used for the signal acquisition, is provided on the upper front of the device. The microphone is specially designed to optimize dictation by the physician in a noisy environment.

An infrared (or induction type) memory signal transmission means or device 56 of the character well known to those skilled in the art is located flush with the left side of the PMD housing (FIG. 3) and functions to enable "connectorless" bi-directional data transfer from the PMD to the receiver means, or dictation receiver 16.

One or more "Non-memory" type rechargeable batteries are disposed inside the PMD housing and are recharged by a conventional battery charger disposed within the housing of the DR 16. The batteries used in the PMD compartment preferably have the capability of powering the device intermittently for a 48 hour period with a total dictating and playback time of six hours.

"Non-volatile" memory (no loss of data with power loss) is assured by providing a separate battery within the PMD component whose only purpose is to maintain memory until the main batteries are recharged. Memory sufficient to store the device program and data tables, plus 60 minutes of compressed speech, is provided within the PMD.

In using the PMD 14, six function keys control recording, playback, erasure, positioning, and option selection in the following manner (see FIG. 1):

RECORD MODE: Pressing the "Record" key 56 once causes the device to begin acquiring an audio signal, begin to digitize the signal, then compress the signal and finally store the compressed signal in the device memory. Pressing 56, or another key, stops recording. Pressing and hold key 56 starts recording which will continue until the key is released.

LEFT ARROW: Pressing the left or back arrow key 58 causes the device to rewind, that is to move back in time in the dictation for a period of five seconds (or to the start if less than five seconds). The PMD will then play back the dictation to the point where the key was pressed and then will stop. Pressing and holding key 58 causes the device to rewind continuously at a progressively rapid rate until the key is released or until the beginning of the dictation is reached, at which time playback begins. Playback ends when the starting position is reached or another key is pressed.

RIGHT ARROW: Pressing the right or forward arrow key 60 causes the device to playback the dictation to the end or until another key is pressed, and then to stop. Holding key 60 down causes the device to "fast forward" that is move forward in time, at a progressively rapid rate until the key is released. The device will then begin playing to the end or until another key is pressed.

STOP—SKIP: Pressing the "Stop—Skip" key 62 stops any current action that may be occurring. Pressing and holding the key causes the device to stop then set itself to a new patient's dictation.

OPTIONS MODE: Pressing the "o" key 64 causes the device to enter the "options" mode so that the user can choose from a number of values for each of a number of options. For example, the first option might be the "Dictator" option wherein the user's name and identification number can be specified by selecting from the list of users (dictators) authorized to use the unit. Another option, "patient location", allows the user to select the location where the patient dictation occurs as, for example, in a hospital or in the doctor's office. Pressing the option key 64 repeatedly causes the display to show the various option categories open to the physician, one after the other. Simultaneously, the option name is "spoken" by "playing" its digitized name as stored in memory of the PMD unit. Holding this key causes each item in this list to be displayed for one second, one after the other with the first ¾ second of each name being "spoken".

The selections available in each option list are displayed and spoken as either the back arrow key 58 or the forward arrow key 60 is pressed. Holding one of these keys moves through the list, one item at a time, displaying for one second and speaking for the first ¾ second the name of the selection.

ERASE: Pressing key 66 causes the current operation to stop. Pressing it again, or simply holding it, causes the PMD to enter the "erase" mode. Pressing any key thereafter stops the erase function.

In addition to the operations described in the preceding paragraphs, it is to be noted that pressing any key of the PMD 14 will cause the current operation to cease. Further, pressing any key except erase causes the operation corresponding to that key to occur.

Figure 9:
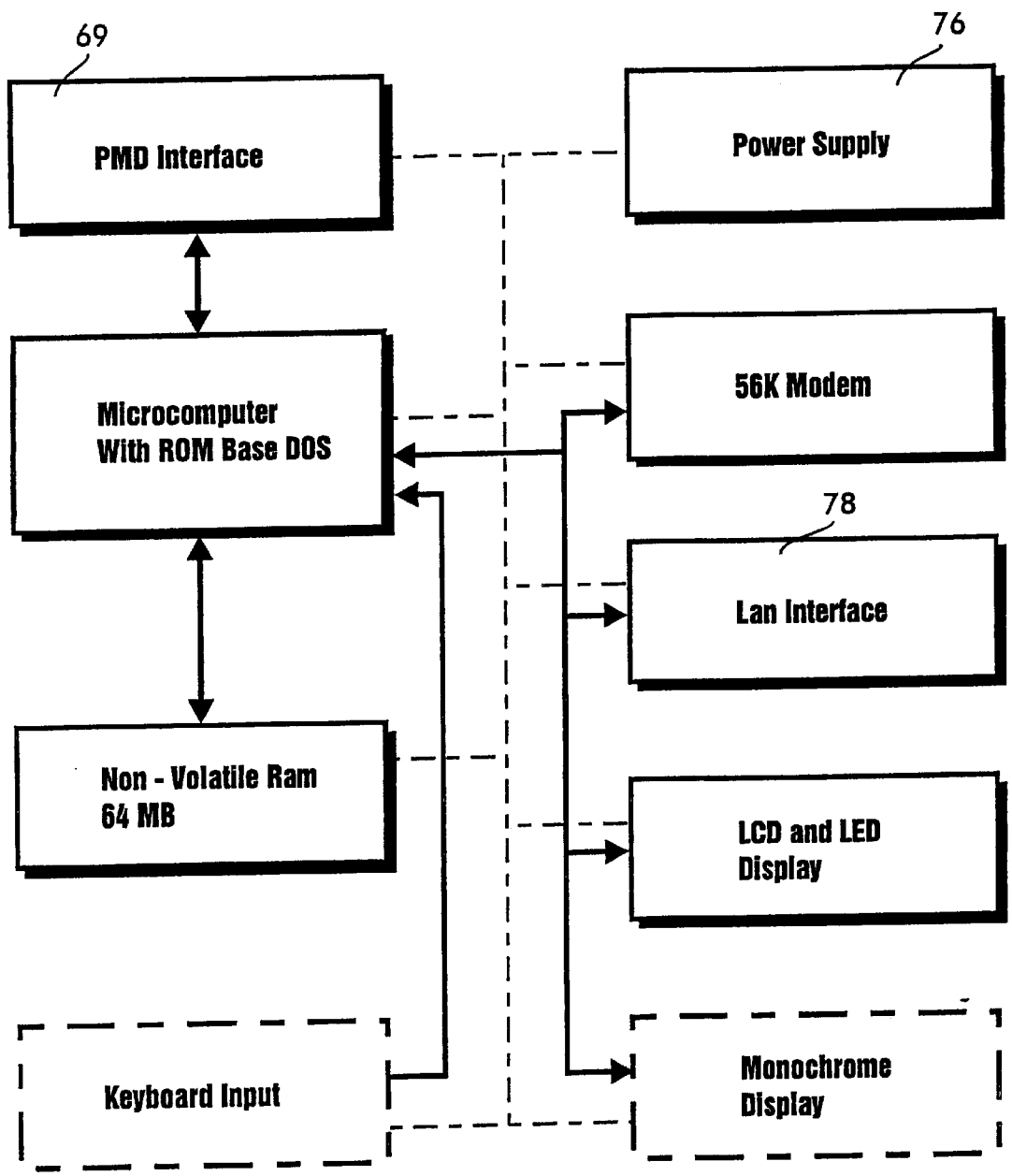
FIG. 9 is a generally diagrammatic view in block diagram form one embodiment of the dictation receiver apparatus of one form of the medical dictation system of the invention.

Turning next to FIGS. 1, 5, 6, and 9, the cooperative interaction between the PMDs 14 and the DRs is there illustrated. As shown in FIGS. 1 and 4 dictation receiver (DR) 16 closely receives the PMDs 14 in the receiving compartments or chambers 20 and 22. As indicated in FIGS. 1 and 9, the DR 16 is, for all practical purposes, a stand-alone special purpose computer or docking station having special interface capabilities necessary to service the PMDs. In normal operation, there is no keyboard or monitor attached to the DR. However, ports may be provided for those peripherals for debugging and troubleshooting support. As depicted in FIG. 9, the PMD interface 69 is the direct interface to the Personal Medical Dictator. This interface supplies AC (~6V rms) power by driving the primary coils of a split toroidal transformer. By sensing the load on this transformer, the interface assesses the state of charge for the rechargeable batteries in the PMD. As previously mentioned, the charging rate supplied to the PMD can be switched between a normal recharge mode and a fast recharge mode. The normal mode will restore the PMD batteries in about 8 hours. The fast mode will recharge the batteries in less than one hour. The PMD interface 69 also implements a high-speed bi-directional data path to the PMD. This data path is preferably implemented as a magnetically coupled path that provides for high speed transfers.

Disposed interiorly of the housing 18 of DR unit is a memory signal receiving means provided here as an infrared or induction-type, bi-directional receiving component. This component aligns with the PMD transmission means or infrared transmission component when the PMD is seated within receiving chambers 20 and 22. In this seated position, the digital memory signal representing the dictated data is immediately transferred from the PMD to the DR 16. Also disposed within the docking station 18 is the previously mentioned recharging hardware. Recharging is preferably done by induction so that the PMD and the DR have no exposed electrical connection points. An electrical cord 70 connects the DR 16 to a suitable wall outlet and a phone wire with RJ 11 extends from the DR and functions to interconnect the unit with a telephone line. An ethernet connection is also available for connecting to a local area net work for more extensive systems. (FIG. 1).

The Power Supply 76 (FIG. 9) of each DR unit generates high quality 5V power for use by the various components of the DR, and also provides the raw 6V AC to the PMD interface. The computer component of each DR 16 comprises a conventional printed circuit card which executes an operating system from ROM. The operating system also preferably includes a LAN interface 78, as for example, a ICP Acquire Card. The motherboard in the DR computer component is an off-the-shelf board that can run readily commercially available software as, for example, Visual Basic, to permit easy and efficient programming.

The LCD and LED display 80 of each DR unit includes several pairs of red and green LEDs and their respective drivers. In a manner well understood in the art, display 80 indicates whether or not the DR is ready to receive more data, and also indicates the status of transfers that are in progress. The LEDs will show steady green (go) as a ready indicator, red (stop) when the system is not available and amber (caution) for indicating that data transfers are in progress. The LCD portion of the display 80 is a four line by 16 character unit for conveying short messages to the user. Conditions indicated by the display include status of transfer to host, amount of memory still available, problems with the LAN interface 82 or with the telephone link and like operating conditions.

As shown in FIG. 1, the LED display 80 is easily visible on the front of the PMD so as to clearly indicate the various functional states of the DR and of the PMD components seated in the DR. These indicators include the following:

"Available"—Appearance of this indicia indicates that there is memory available in the DR to accept input from one or more PMDs. When only one white LED is illuminated there is enough memory available in the DR to accommodate only one PMD dictation. If both LEDs are illuminated two PMD dictations can be accommodated.

"Operating"—This indicia indicates that the PMD is properly seated in the receiving compartment and that data transmission is taking place. According, the PMD should not be removed from the receiving compartment, when this signal is illuminated. One Yellow (caution) LED is provided for each receiving compartment.

"Complete"—When this indicia appears, the physician is notified that data contained within the PMD has been successfully transmitted from the PMD to the DR. This indicia also indicates that the PMD's memory has been reset so that the PMD can be safely removed. One Green (go) LED is provided for each receiving compartment. When the DR completes its data transfer to the central processing area (CPA), a second Green LED for receiving compartment containing a PMD compartment will illuminate confirming successful transmission of DR's memory and/or successful reprogramming.

"Not Available"—When this indicia appears, the physician is thereby advised that the receiving compartment is empty but not "available" for insertion of a PMD because there is insufficient memory in the DR to accept dictation from a PMD. One Red LED is provided for each receiving compartment in the DR.

When data has been transferred from the PMDs seated in the DR, and when one or both of the green LEDs are illuminated, the PMDs can safely be removed. If there is insufficient memory available in one of the compartments for another PMD to be received, red LED for that receiving compartment will illuminate and will remain illuminated until enough memory becomes available in the DR to accept dictation from another PMD.

Having now described the invention in detail in accordance with the requirements of the patent statutes, those skilled in this are will have no difficulty in making changes and modifications in the individual parts or their relative assembly in order to meet specific requirements or conditions. Such changes and modifications may be made without departing from the scope and spirit of the invention, as set forth in the following claims.

I claim:

1. A system for capturing and preserving audio information, the system comprising:
    a) a portable audio recording device comprising:
        a microphone for receiving the audio information and for generating therefrom an electrical signal representative of the audio information;
        a digital signal processor for receiving the electrical signal from the microphone and for generating in response thereto a digital memory signal representative of the electrical signal;
        a storage medium for storing the digital memory signal; and
        a first memory signal transmitter operably associated with the digital signal processor for transferring the digital memory signal from the audio recording device;
    b) a base cooperatively associated with the portable audio recording device for receiving the digital memory signal therefrom, the base comprising:
        a housing having at least one receptacle for receiving the portable audio recording device;
        a computer having a memory;
        a memory signal receiver for receiving the digital memory signal from the memory signal transmitter of the portable audio recording device;
        a second memory signal transmitter operably associated with the memory signal receiver for transferring the digital memory signal to the computer; and
        a data transmitter operably associated with the computer for transmitting data stored therein; and
    c) a data processor operably associated with the base for receiving data therefrom and for producing a record thereof.

2. The system of claim 1, wherein the portable audio recording device further comprises a digital to analog converter operably associated with the storage medium.

3. The system of claim 2, wherein the portable audio recording device further comprises an audio speaker operably associated with the digital to analog converter for generating and emitting an acoustic signal.

4. The system of claim 1, wherein the storage medium of the portable audio recording device further comprises instructional or informational messages.

5. The system of claim 1, wherein the system is capable of providing audio prompts.

6. The system of claim 5, wherein the system is capable of providing the audio prompts selectively according to habits of a user.

7. The system of claim 1, wherein the system is reprogrammable.

8. The system of claim 1, wherein the portable audio recording device further comprises a visual display.

9. The system of claim 1, wherein the base further comprises a visual display.

10. The system of claim 1, wherein the portable audio recording device further comprises a sleep mode wherein if no audio information is detected by the microphone for a set time period, the device automatically reduces power.

11. The system of claim 1, wherein the data is automatically transferred from the base to the data processor when the portable audio recording device is positioned within the at least one receptacle of the housing.

12. The system of claim 1, wherein the memory signal transmitter comprises an infrared, bi-directional transmission component.

13. The system of claim 1, wherein the memory signal transmitter comprises an induction-type transmission component.

14. The system of claim 1, wherein the portable audio recording device further comprises rechargeable batteries.

15. The system of claim 14, wherein the base further comprises a battery charger for charging the batteries when the portable audio recording device is positioned within the at least one receptacle of the housing.

16. The system of claim 15, wherein the battery charger comprises an induction-type charger.

17. The system of claim 15, wherein the rechargeable batteries are automatically recharged when the portable audio recording device is positioned within the at least one receptacle of the housing.

18. The system of claim 1, wherein the data processor further comprises a transcribing device for converting the digital memory signal into a written transcript.

19. The system of claim 1, wherein the microphone of the portable audio recording device further comprises a four-pole filter.

20. The system of claim 1, wherein the memory of the base is non-volatile.

21. The system of claim 1, wherein the storage medium of the portable audio recording device is non-volatile.

22. The system of claim 1, wherein the system is capable of automatically sending identifying information to the data processor.

23. The system of claim 1, wherein the system is programmable to function specifically for particular characteristics of a user.

24. The system of claim 23, wherein the programmable system is usable to specify whether certain of the audio information is routine or is to be transcribed immediately.

* * * * *